(12) United States Patent
Khosrowbeygi et al.

(10) Patent No.: US 6,531,922 B1
(45) Date of Patent: Mar. 11, 2003

(54) DC-COUPLING APPROACH FOR CURRENT MODE CIRCUITS

(75) Inventors: Abolfazl Khosrowbeygi, Sunnyvale, CA (US); Hongyu Li, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/688,773

(22) Filed: Oct. 16, 2000

(51) Int. Cl.$^7$ ................................. H03F 3/04
(52) U.S. Cl. ............... 330/288; 330/257; 323/315
(58) Field of Search ................. 330/257, 288; 323/315, 316

(56) References Cited

U.S. PATENT DOCUMENTS 5,673,002 A * 9/1997 Kobayashi et al. ......... 330/288
6,018,271 A * 1/2000 Yuasa ........................ 330/288

* cited by examiner

Primary Examiner—Benny Lee
Assistant Examiner—Henry Choe
(74) Attorney, Agent, or Firm—Michael Schmitt

(57) ABSTRACT

The present invention is directed to advantages discovered in connection with controlling DC current passing between and adversely affecting cascaded current-mode blocks. According to a particular example application, the present invention includes first and second cascaded current-mode circuit blocks, and a circuit-replication and comparison block adapted to replicate the operation and output impedance of the first current-mode circuit block and to replicate the operation and input impedance of the second current-mode circuit block. This replication-comparison block includes a differential comparator adapted to detect and correct for a voltage differential corresponding to current passing from the first current-mode circuit block and the second current-mode circuit block. This approach can result in a number advantages relating to improvements in terms of various operational aspects including, for example, reductions in power consumption.

20 Claims, 3 Drawing Sheets

DC-COUPLING APPROACH FOR CURRENT MODE CIRCUITS

FIELD OF THE INVENTION

The present invention relates generally to circuits and techniques for controlling current-mode circuits such as amplifiers, mixers and the like. More particularly, the present invention has found specific advantageous application in circuit environments where current-mode circuits are sensitive to voltage excursions at input and/or output ports thereof.

BACKGROUND

The electronics industry continues to strive for high-powered, high-functioning circuits. Significant achievements in this regard have been realized through the fabrication of very large-scale integration of circuits on small areas of silicon wafer. For applications directed to high-frequency communications, main objectives in the design and manufacturing of such devices are typically directed to obtaining circuitry that occupies as small an area and uses the smallest amount of power as practicable, while at the same time preserving the integrity of the data being communicated by the signal.

One type of circuit often used in connection with communications applications is commonly referred to as a current-mode circuit. A current-mode circuit is used in a wide variety of electronic products including, but not limited to, global positioning (GPS) receivers, cordless and cellular phone circuits, wireless local area networks and other types of mobile communication receivers and transmitters ("transceivers").

With current-mode circuits, the current amplification is taken into account and the nonlinearity in the voltage swing is not important. In such a circuit, should DC coupling to another circuit block be required, the overall operation of the circuit may be susceptible to an unwanted DC voltage due to a significant nonlinearity in voltage swing associated with the DC coupling. This unwanted DC voltage can saturate the output of the circuit block and thereby severely degrade the overall operation.

Such DC voltage influences can cause unacceptable operation in various types of communications applications, such as radio frequency (RF), intermediate frequency (IF) and the low frequency, and/or in connection with base-band signal processing. For example, in a power mixer circuit, any extraneous DC current flowing into the final mixer stage can result in an intolerably large increase in current consumption and, in some circuit designs, unacceptable signal distortion.

In a typical current-mode circuit block, the output impedance of each functional block is preferably as high as possible. Ideally, each functional block is designed with an output impedance that mimics an ideal current source and with an input impedance that tracks a zero-Ohm circuit. Main objectives in the design of such circuits include controlling the input and output impedance levels and maintaining the voltage at desirable levels. Failing to maintain the input impedance, the output impedance or the control voltage can result in huge increases in power consumption and other operational disadvantages including, for example, significant increases in noise and degradations in linearity performance.

Accordingly, there is a need to provide a current-mode circuit and technique that overcomes the above-mentioned disadvantages.

SUMMARY

The present invention is implemented in various embodiments directed to addressing the above applications and concerns, as well as other advantages that will become apparent upon a careful review of the following discussion. For example, certain aspects of the invention are directed to advantages discovered in connection with controlling current passing between cascaded current-mode blocks by using a feedback loop to control DC voltage levels at the interface between the current-mode blocks. Appropriately implemented, this approach can result in a number advantages relating to improvements in terms of reductions in power consumption and mitigation of other problems relating to, for example, dynamic range and linearity.

According to a particular example application, the present invention includes first and second cascaded current-mode circuit blocks, and a circuit-replication and comparison block adapted to replicate the operation and output impedance of the first current-mode circuit block and to replicate the operation and input impedance of the second current-mode circuit block. The replication-comparison block can be implemented to include a differential comparator adapted to detect and correct for a voltage differential corresponding to current passing from the first current-mode circuit block and the second current-mode circuit block. This approach can result in a number advantages relating to improvements in terms of various operational aspects including, for example, reductions in power consumption.

The above summary is not intended to provide an overview of all aspects of the present invention. Other aspects of the present invention are exemplified and described in connection with the detailed description.

BRIEF DESCRIPTION OF THE DRAWINGS

The invention may be more completely understood in consideration of the detailed description of various embodiments of the invention which follows in connection with the accompanying drawings, in which.

Figure 1:
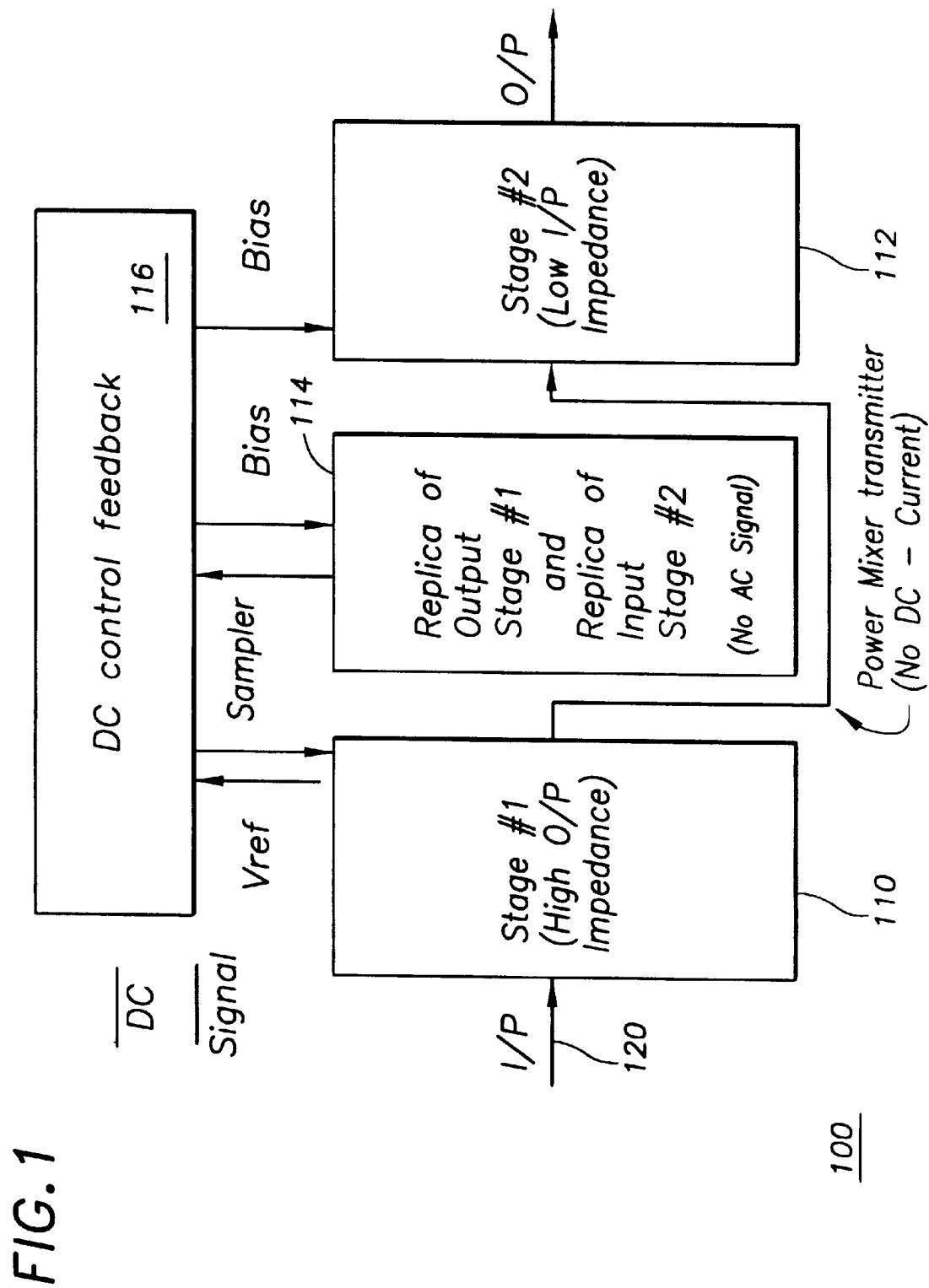
FIG. 1 illustrates a block diagram of a current-mode circuit arrangement, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DISCLOSED EMBODIMENTS

The present invention is believed to be applicable to a variety of current-mode circuits and applications. The invention has been found to be particularly beneficial for high-frequency signal-processing circuit arrangements where extraneous DC current flowing from one current-mode circuit to a casaded second current-mode circuit can result in operational shortcomings including but not limited to an intolerably large increase in current consumption and, in some circuit designs, unacceptable signal distortion. While the present invention is not necessarily limited to such circuits or applications, various aspects of the present invention are best appreciated by a discussion of example embodiments operating in such environments.

Turning now to the drawings and in accordance with the present invention, FIG. 1 illustrates a block diagram of an example cascaded current-mode circuit arrangement 100 including a first current-mode circuit block 110 and a second current-mode circuit block 112. The first current-mode circuit block 110 has an input impedance level that is significantly less than the output impedance level of the second current-mode circuit block 112; ideally, the input impedance level is effectively 0 Ohms and the output impedance level is so large that it is effectively infinity Ohms. Another current-mode circuit block 114 is designed to be a functional replica for the operation and impedance of the output stage of the first current-mode circuit block 110 and also of the input stage of the second current-mode circuit block 112. Rather than directly feeding a DC current from the first current-mode circuit block to the second current-mode circuit block, one the AC component of the signal is passed from the first current-mode circuit block to the second current-mode circuit block, and the DC component of the signal (without the AC component) is monitored using the replica current-mode circuit block 114 and removed by a DC control/feedback block 116. The DC control/feedback block 116 monitor this current by detecting a voltage differential across a resistive path connecting the replicated stages for the output of the first and the input of the second current-mode circuit blocks 110 and 112. By effectively monitoring and removing this passing DC current without actually passing the DC current between cascaded current-mode circuit blocks 110 and 112, the present invention avoids unwanted DC voltage excursions due to a significant non-linearity in voltage swing associated with the DC coupling. As mentioned previously, this unwanted DC voltage can generate an offset current which can saturate the output of the circuit block and thereby severely degrade the overall operation.

In one particular example embodiment and application of the present invention, the cascaded current-mode circuit arrangement 100 is used as a power-mixer transmitter, for example, as may be used in cellular communication system transmitters. In this regard, the first current-mode circuit block 110 is a first stage thereof, such as an intermediate-frequency (IF) phase shifter including a poly-phase filter, adapted to convert the signal input 120 (filtered to remove any DC current) to phase-quadrature (I/Q) form for presentation to the second current-mode circuit block 11 in the form of a power (signal-amplifying) mixer.

An example signal-processing application is useful in illustrating this operation. Assume in this application that the output stage of first current-mode circuit block 110 is a common-base transistor arrangement with each of four matched common-base bipolar transistors (I, Q, Ibar and Qbar) having its emitter as an input and its collector as an output. The portion of the replica circuit 114 corresponding to this output stage is another matched common-base bipolar transistor. This other matched common-base bipolar transistor is similarly loaded with its emitter and collector connected to the same respective matched circuitry corresponding to that coupled to each of the four matched common-base bipolar transistors. However, unlike each of the four matched common-base bipolar transistors, this other matched common-base bipolar transistor does not pass an AC signal component but rather passes only the DC component not present in the actual output stages of the four matched common-base transistors. This DC component is passed from the collector of this replica transistor circuit through a resistive path which, in turn, connects to a replica input stage of the second current-mode circuit block 112. This replica input stage is a low impedance circuit which replicates the operation and behavior of the input stage which would otherwise receive the output of one of the four matched common-base bipolar transistors. This resistive path is thereby used for passing DC current and creating a voltage differential which is monitored and removed using biasing fed back to the replica block 114 and at least one of the blocks 110 and 112 as shown in FIG. 1. In one more specific embodiment, the replica input stage realizes a low impedance circuit using the base-emitter path of a bipolar transistor that is impedance matched to Accordingly, in response to the generated voltage differential, the DC-control/feedback block 116 can adjust current bias levels at both the replica current-mode circuit block 114 and at least one of the first and second current-mode circuit blocks 110 and 112 without creating undesirable voltage excursions. Moreover, by using the replica current-mode circuit block 114 in this manner and also operating at a lower frequency than the input signal frequency, the DC voltage actually presented to the second current-mode circuit block 112 is maintained at the desired level and is not affected by the typically rectified nonlinear signal.

Figure 2:
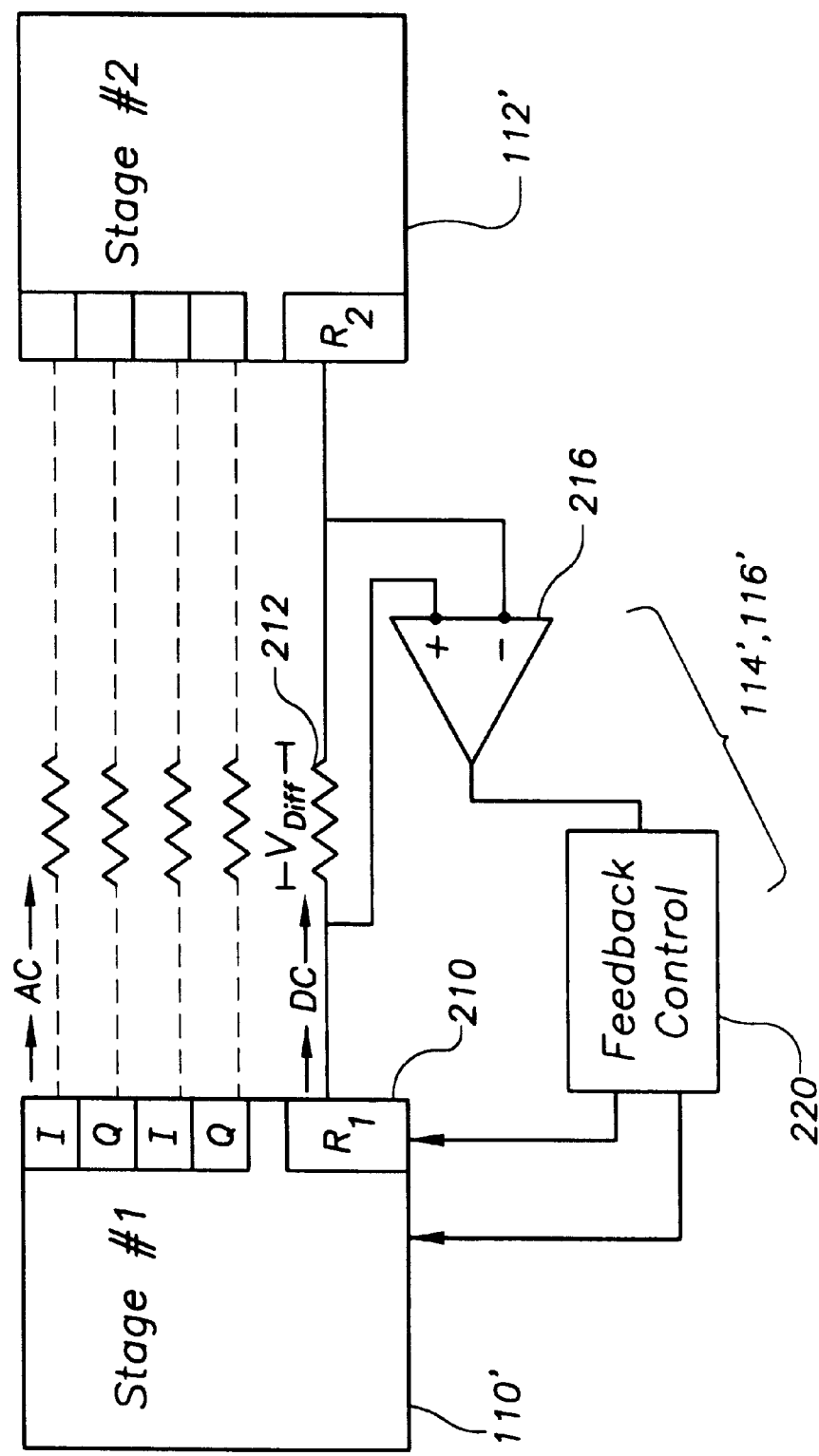
FIG. 2 illustrates a specific example implementation of the circuit arrangement of FIG. 1, also in accordance with the present invention.

FIG. 2 illustrates the above discussion in connection with the power-mixer transmitter application and embodiment, using like numerals to depict corresponding circuit blocks. In this example embodiment, each of the four output stages mimicked using a replica output stage 210 adapted to feed any DC current offset through a resistor 212. The voltage differential detected across this resistor 212 is detected by a differential amplifier 216 which, in turn, feeds a DC control and feedback circuit 220. The DC control and feedback circuit 220 is then used to provide a bias signal to adjust the DC current in each of the replica output stage 210 and in the first block 110'.

For additional example circuits corresponding to such blocks, reference may be made to the attached 4-page appendix which is an example circuit diagram for the above-discussed application and embodiment.

Figure 3:
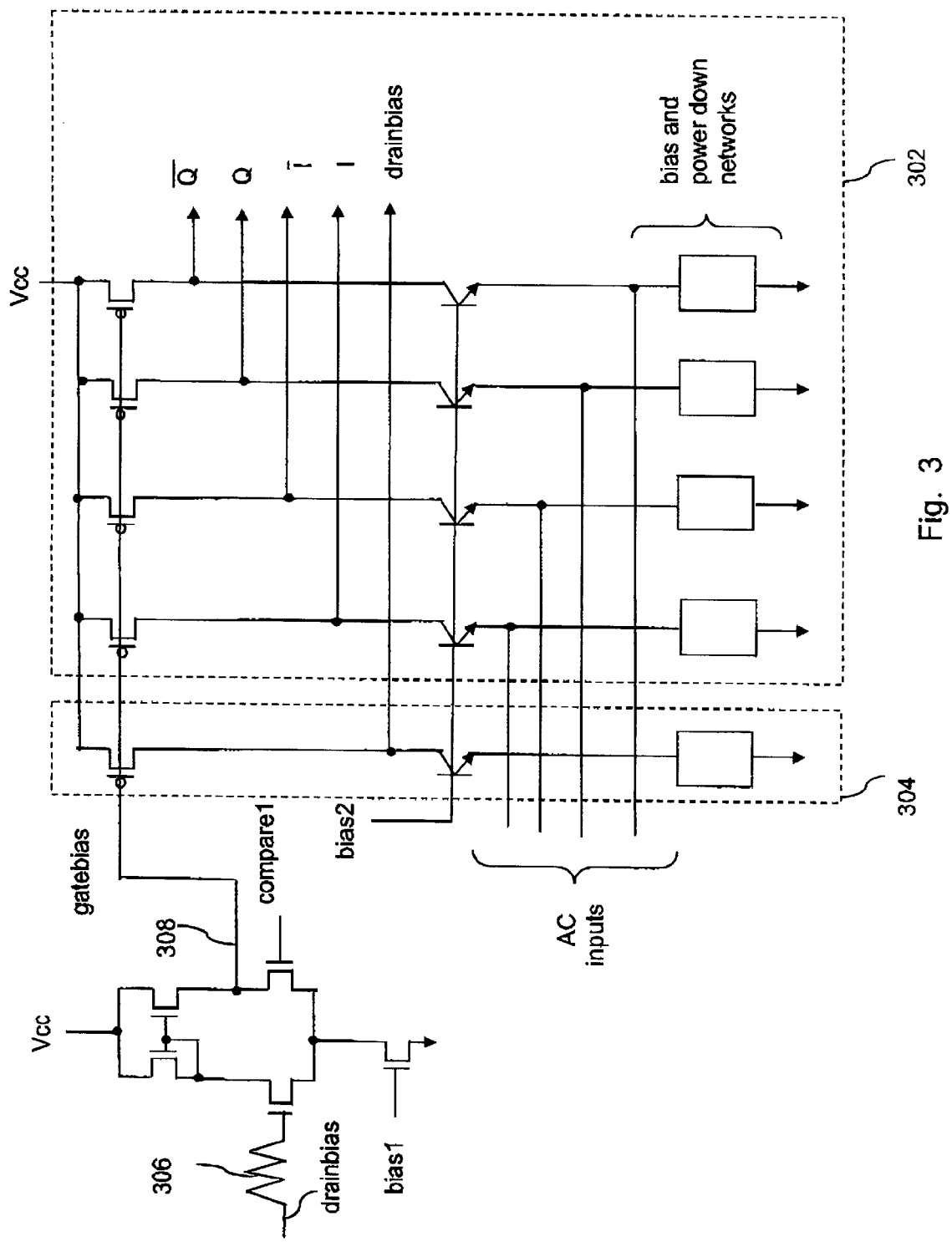
FIG. 3 is a schematic diagram illustrating four output stages and a fifth output stage configured to replicate the circuit configuration of the four output stages, wherein the fifth output stage is coupled to a resistive pathway, the resistive pathway is coupled to a comparison circuit, and the comparison circuit provides feedback to the output stages.

FIG. 3 is a schematic diagram showing an illustrative example of a replicated output stage passing a DC signal by way of a resistive pathway to control circuitry that provides feedback to, at least, other similarly configured output stages, in accordance with the present invention. As can be seen in FIG. 3, circuit block 302 includes four output stages, each configured so that the base terminal of each bipolar transistor is coupled in common, and further configured such that the collector terminal of each bipolar transistor is coupled to a positive power supply node (Vcc) through a p-channel field effect transistor where each p-channel field effect transistor has its gate terminal coupled in common. The four bipolar transistors in block 302 have input signals coupled to their emitters. Circuit block 304 shows a replicated output stage including a bipolar transistor having a base terminal coupled in common with base terminals of the bipolar transistors in circuit block 302. Circuit block 304 further shows that the collector terminal of the bipolar transistor is coupled to Vcc through a p-channel field effect transistor which has its gate terminal coupled in common with the p-channel field effect transistors of circuit block 302. It is noted, that no AC signal is coupled to the emitter of the bipolar transistor in the replicated output stage. An output signal (labelled "drainbias" in FIG. 3) of the replicated output stage is taken from the collector terminal of the bipolar transistor and coupled via resistor 306 to feedback control circuitry that provides an output signal at node 308 (also labelled "gatebias"). The feedback control circuitry also receives a signal derived from the output signals (I, I-bar, Q, and Q-bar in FIG. 3) of the output stages. The signal "gatebias" is coupled in common to the gate terminals of the p-channel field effect transistors that couple Vcc to the collector terminals of the bipolar transistors in both circuit blocks 302 and 304. In this way the output of the replicated output stage is used to develop feedback control for the output stages of circuit block 302.

In various applications, the specific implementation of the replica current-mode circuit block relative to the second current-mode circuit block will vary. As mentioned above, the replica current-mode circuit block is a functional replica for the operation of the second current-mode circuit block and not necessarily a circuit-duplication. Moreover, with respect to the replica for the input of the second block, power savings are realized using down-scaled component sizes and values; in one example implementation, this down-scaling is achieved using a factor of a fourth for sizes and values.

Accordingly, the present invention is directed to a circuit arrangement for DC-coupling between two current-mode circuit arrangement and signal processing approach for realizing significant advantages in terms of, among other aspects, power consumption. The various embodiments described above are provided by way of illustration only and are not intended to limit the invention. Those skilled in the art will readily recognize various modifications and changes that may be made to the present invention without strictly following the example embodiments and applications illustrated and described herein. The scope of the present invention is set forth in the following claims.

What is claimed is:

1. A current-mode circuit arrangement, comprising:
   first and second current-mode circuit blocks, the first current-mode circuit block having an output impedance that is significantly higher than an input impedance at a port of the second current-mode circuit block which port is current driven by the first current-mode circuit block;
   a third circuit block configured and arranged to replicate the operation and output impedance of the first current-mode circuit block and to replicate the operation and input impedance of the second current-mode circuit block; and
   a DC control block configured and arranged to respond to a voltage differential in the third current-mode circuit block corresponding to current passing from the first current-mode circuit block and the second current-mode circuit block by removing the voltage differential.

2. A current-mode circuit arrangement, according to claim 1, wherein the DC control block is further configured and arranged to respond to the voltage differential by biasing the third current-mode circuit block.

3. A current-mode circuit arrangement, according to claim 1, wherein the DC control block is further configured and arranged to respond to the voltage differential by biasing the first current-mode circuit block.

4. A current-mode circuit arrangement, according to claim 1, wherein the DC control block is further configured and arranged to respond to the voltage differential by biasing the second current-mode circuit block.

5. A current-mode circuit arrangement, according to claim 1, wherein the DC control block is further configured and arranged to respond to the voltage differential by biasing the third current-mode circuit block and at least one of the first and second current-mode circuit blocks.

6. A current-mode circuit arrangement, according to claim 1, wherein the first current-mode circuit block is one of a plurality of stages of a high-frequency signal-processing circuit.

7. A current-mode circuit arrangement, according to claim 6, wherein the second current-mode circuit block is another, second stage of the high-frequency signal-processing circuit.

8. A current-mode circuit arrangement, according to claim 7, wherein the high-frequency signal-processing circuit is a power-mixer transmitter.

9. A current-mode circuit arrangement, according to claim 7, wherein the first current-mode circuit block is an intermediate-frequency phase shifter adapted to produce a phase quadrature signal.

10. A current-mode circuit arrangement, according to claim 9, wherein the second current-mode circuit block is adapted to amplify the phase quadrature signal.

11. A current-mode circuit arrangement, according to claim 10, wherein the third current-mode circuit block includes a replica of an output stage of the first current-mode circuit block.

12. A current-mode circuit arrangement, according to claim 10, wherein the third current-mode circuit block includes a replica of an input stage of the second current-mode circuit block.

13. A current-mode circuit arrangement, comprising:
   first and second means for current-mode signal processing, the first means having an output impedance that is significantly higher than an input impedance at a port of the second means which port is current driven by the first means;
   third circuit means for replicating the operation and output impedance of the first means and replicating the operation and input impedance of the second means; and
   DC control means, responsive to a voltage differential in the third circuit means corresponding to current passing from the first means to the second means, for removing the voltage differential.

14. A current-mode circuit arrangement, according to claim 13, wherein the DC control means is also for biasing at least one of the first, second and third current-mode circuit blocks in response to the voltage differential.

15. A current-mode circuit arrangement, according to claim 13, wherein the first circuit means is one of a plurality of stages of a high-frequency signal-processing circuit.

16. A current-mode circuit arrangement, according to claim 15, wherein the second circuit means is another, second stage of the high-frequency signal-processing circuit.

17. A current-mode circuit arrangement, according to claim 16, wherein the second current-mode circuit block is adapted to amplify a signal output from the first current-mode circuit block.

18. A current-mode circuit arrangement, comprising:
   first and second current-mode circuit blocks, the first current-mode circuit block adapted to process a high-frequency input signal and having an output impedance that is significantly higher than an input impedance at a port of the second current-mode circuit block which port is current driven by the first current-mode circuit block; and a circuit-replication and comparison block configured and arranged to replicate the operation and output impedance of the first current-mode circuit block and to replicate the operation and input impedance of the second current-mode circuit block, the circuit-replication and comparison block including a differential comparator adapted to detect and correct for a voltage differential corresponding to current passing from the first current-mode circuit block and the second current-mode circuit block.

19. The arrangement of claim 18, wherein the second current-mode circuit block is adapted to amplify a phase-based signal output from the first current-mode circuit block.

20. The arrangement of claim 18, wherein the circuit-replication and comparison block is further configured and arranged to remove the voltage differential by biasing the first current-mode circuit block.

* * * * *